US012789751B2

(12) United States Patent
Lee

(10) Patent No.: US 12,789,751 B2
(45) Date of Patent: Nov. 10, 2026

(54) METHOD FOR PROVIDING A DIGITAL KEY SERVICE, A VEHICLE AND A MANAGEMENT SERVER FOR THE SAME

(71) Applicants: HYUNDAI MOTOR COMPANY, Seoul (KR); KIA CORPORATION, Seoul (KR)

(72) Inventor: Seok Han Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 87 days.

(21) Appl. No.: 18/904,474

(22) Filed: Oct. 2, 2024

(65) Prior Publication Data

US 2025/0115212 A1 Apr. 10, 2025

(30) Foreign Application Priority Data

Oct. 6, 2023 (KR) ........................ 10-2023-0133191

(51) Int. Cl.
*B60R 25/24* (2013.01)

(52) U.S. Cl.
CPC .................................. *B60R 25/241* (2013.01)

(58) Field of Classification Search
None
See application file for complete search history.

(56) References Cited

U.S. PATENT DOCUMENTS

2023/0106867 A1* 4/2023 Chan ....................... B60R 25/31 701/2
2025/0296528 A1* 9/2025 Fujino ................... B60R 25/241

* cited by examiner

*Primary Examiner* — Nabil H Syed
(74) *Attorney, Agent, or Firm* — Fish & Richardson P.C.

(57) ABSTRACT

A method of providing a digital key service, in the vehicle for which the digital key service is provided through the management server for digital keys that issues and manages digital keys and shared keys when a request for issuance of the digital keys and the shared keys is transmitted through a user interface, can include registering a first profile at a user's request, receiving a first digital key including a first slot ID from the management server for digital keys and, linking the first profile to the first slot ID, receiving the shared key, and selecting a profile based on the result of comparing a second slot ID in the shared key and the first slot ID.

19 Claims, 6 Drawing Sheets

| Number | Example of Use | Account | Slot ID | Key data | |
|---|---|---|---|---|---|
| 1 | Perform owner paring for aaa@naver.com | aaa@naver.com | 0 | Owner 1st key | 0340ADC40543SJKLA3340DCVJDJQPDKJF |
| 2 | Share watch key with aaa@naver.com | aaa@naver.com | 0 | Owner 1st key | F340ADC40543SJKLA3340DCVJDJQPDKJF |
| | | | | Owner watch key | 95961DC40543SJKLA3340DCVJDJQPDKJF |
| 3 | Share phone key with zzz@daum.net | aaa@naver.com | 0 | Owner 1st key | F340ADC40543SJKLA3340DCVJDJQPDKJF |
| | | | | Owner watch key | 95961DC40543SJKLA3340DCVJDJQPDKJF |
| | | ZZZ@daum.net | 1 | Shared phone key | 11111DC40543SJKLA3340DCVJDJQPDKJF |
| 4 | Share phone key with www@gmail.com | aaa@naver.com | 0 | Owner 1st key | F340ADC40543SJKLA3340DCVJDJQPDKJF |
| | | | | Owner watch key | 95961DC40543SJKLA3340DCVJDJQPDKJF |
| | | ZZZ@daum.net | 1 | Shared phone key | 11111DC40543SJKLA3340DCVJDJQPDKJF |
| | | WWW@gmail.com | 2 | Shared phone key | ZYZX1DC40543SJKLA3340DCVJDJQPDKJF |
| 5 | Share watch key with www@gmail.com | aaa@naver.com | 0 | Owner 1st key | F340ADC40543SJKLA3340DCVJDJQPDKJF |
| | | | | Owner watch key | 95961DC40543SJKLA3340DCVJDJQPDKJF |
| | | ZZZ@daum.net | 1 | Shared phone key | 11111DC40543SJKLA3340DCVJDJQPDKJF |
| | | WWW@gmail.com | 2 | Shared phone key | ZYZX1DC40543SJKLA3340DCVJDJQPDKJF |
| | | | | Shared watch key | POPO3C40543SJKLA3340DCVJDJQPDKJF |
| 6 | Share 2nd phone key with zzz@daum.net | aaa@naver.com | 0 | Owner 1st key | F340ADC40543SJKLA3340DCVJDJQPDKJF |
| | | | | Owner watch key | 95961DC40543SJKLA3340DCVJDJQPDKJF |
| | | ZZZ@daum.net | 1 | Shared phone key | 11111DC40543SJKLA3340DCVJDJQPDKJF |
| | | | | Shared phone key | YOY8DC40543SJKLA3340DCVJDJQPDKJF |
| | | WWW@gmail.com | 2 | Shared phone key | ZYZX1DC40543SJKLA3340DCVJDJQPDKJF |
| | | | | Shared watch key | POPO3C40543SJKLA3340DCVJDJQPDKJF |
| 6 | Share 2nd phone key with zzz@daum.net | aaa@naver.com | 0 | Owner 1st key | F340ADC40543SJKLA3340DCVJDJQPDKJF |
| | | | | Owner watch key | 95961DC40543SJKLA3340DCVJDJQPDKJF |
| | | | | Owner 2nd phone key | 85936DC40543SJKLA3340DCVJDJQPDKJF |
| | | ZZZ@daum.net | 1 | Shared phone key | 11111DC40543SJKLA3340DCVJDJQPDKJF |
| | | | | Shared phone key | YOY8DC40543SJKLA3340DCVJDJQPDKJF |
| | | WWW@gmail.com | 2 | Shared phone key | ZYZX1DC40543SJKLA3340DCVJDJQPDKJF |
| | | | | Shared watch key | POPO3C40543SJKLA3340DCVJDJQPDKJF |

FIG. 4

METHOD FOR PROVIDING A DIGITAL KEY SERVICE, A VEHICLE AND A MANAGEMENT SERVER FOR THE SAME

CROSS-REFERENCE TO RELATED APPLICATIONS

The present application claims priority to Korean Patent Application No. 10-2023-0133191, filed on Oct. 6, 2023, the entire contents of which is incorporated herein for all purposes by this reference.

TECHNICAL FIELD

The present disclosure relates to a method of providing a digital key service, a vehicle for which the service is provided, and a management server therefor.

BACKGROUND

As vehicle functions become increasingly diverse, it can be cumbersome to set them individually. To address this issue, the profile function has been proposed as a solution.

The profile function enhances user convenience by linking personal settings for various vehicle functions to registered profiles.

For example, by linking the profiles, users can simultaneously switch settings for seat positions, head-up displays, outside mirrors, infotainment systems (such as recent destinations on a navigation system, home screen widgets, and mobile phone settings), clusters (like fuel efficiency units), air conditioning, and more to their pre-existing configurations.

Multiple profiles can be registered in a single vehicle, and users can select profiles through a user interface on an audio video navigation (AVN) screen.

Additionally, digital keys have been introduced to enhance user convenience, allowing users to register and use digital keys on their smartphones or NFC cards.

In other words, users can register a digital key on a smartphone or NFC card to unlock vehicle doors or start the vehicle. Since digital keys are not physical objects, they can be easily shared with others.

The profile function can also be linked to digital keys, enabling automatic profile selection based on the digital key in use, even if the user does not manually select a profile on the AVN screen.

For example, when a driver starts the vehicle using a smartphone key, the profile linked to that smartphone key is automatically selected, and the vehicle's settings are adjusted to the corresponding personal configurations.

The profile function in vehicles is available through a head unit and can be utilized by connecting one of the registered digital keys with a smartphone or smartwatch.

For enhanced user convenience, it should be possible to link a profile to multiple devices rather than just one. Additionally, there is a need for technology that can automatically link a profile to a driver's new device when the driver's phone is already linked to the profile and the digital key is shared with the new device, such as a smartphone or smartwatch.

SUMMARY

The present is directed to linking a profile to multiple devices rather than just one, and providing a method and an apparatus where a device with a shared digital key is automatically registered to a vehicle and a profile is linked thereto accordingly.

According to one aspect of the subject matter described in this application, a vehicle, for which a digital key service is provided through a management server that issues and manages digital keys and shared keys when a request for issuance of the digital keys and the shared keys is transmitted through a user interface of the vehicle or a user terminal, can be configured to register a first profile according to a user's request, store a first digital key including a first slot ID received from the management server, link the first slot ID to the first profile, receive and store the shared key, and select a profile based on a result of comparing a second slot ID in the shared key and the first slot ID.

In some implementations, the selecting of a profile can include selecting the first profile for the shared key in response that the second slot ID matches the first slot ID.

In some example, the selecting of a profile can further include selecting a corresponding profile for the shared key in response that the second slot ID matches a slot ID liked to the corresponding profile.

In some implementations, the vehicle can be further configured to receive a request for access by a third digital key through a user terminal, perform an authentication by comparing the third digital key with the first digital key and the shared key, and switch the current profile of the vehicle to a profile selected based on a third slot ID included in the third digital key.

In some implementations, the switching to the profile selected based on the third slot ID in the third digital key can include switching to the first profile in response the third slot ID matches the first slot ID.

In some implementations, a management server, which issues and manages digital keys and shared keys in response that a request for issuance of the digital keys and the shared keys is transmitted through a user interface of a vehicle or a user terminal, can be configured to in response that first user information and a request for issuance of a first digital key are received, issue the first digital key with a first slot ID included and transmitted to a first user terminal and the vehicle, and in response that second user information and a request for issuance of a shared key are received, issue the shared key with a slot ID determined based on a result of comparing the first user information and the second user information and transmit to a terminal to be given a shared key and the vehicle.

In some implementations, the issuing and transmitting of the first digital key can include registering a first account based on the first user information and linking the first slot ID to the first account.

In some implementations, the issuing and transmitting of the shared key can include determining a second account based on the second user information.

In some implementations, the issuing and transmitting of the shared key can further include issuing the shared key with the first slot ID included in response that the second account matches the first account.

In some implementations, the issuing and transmitting of the shared key can further include issuing the shared key including a slot ID other than the first slot ID in response that the second account does not match the first account.

In some implementations, the issuing of the shared key including a slot ID other than the first slot ID can include issuing the shared key with the same slot ID as a slot ID of a shared key that has been already issued in response that the second account matches a third account of the shared key that has been already issued and issuing the shared key with a new slot ID in response that the second account does not match the third account.

In some implementations, the first digital key and the shared key can include information on a type of user terminal in which they are to be stored.

According to another aspect of the subject matter described in this application, a method of providing a digital key service through a management server that issues and manages digital keys and shared keys in response that a request for issuance of the digital keys and the shared keys is transmitted through a user interface of a vehicle or a user terminal can include registering, by the vehicle, a first profile according to a user's request, receiving and storing, by the vehicle, a first digital key including a first slot ID from the management server, linking, by the vehicle, the first slot ID to the first profile, receiving and storing, by the vehicle, the shared key, and selecting, by the vehicle, a profile based on a result of comparing a second slot ID in the shared key and the first slot ID.

In some implementations, the selecting of a profile can include selecting the first profile for the shared key in response that the second slot ID matches the first slot ID.

In some implementations, the selecting of a profile can further include selecting a corresponding profile for the shared key in response that the second slot ID matches a slot ID liked to the corresponding profile.

In some implementations, the method can further comprise receiving, by the vehicle, a request for access by a third digital key through a user terminal, performing an authentication by comparing the third digital key with the first digital key and the shared key, and switching the current profile of the vehicle to a profile selected based on a third slot ID included in the third digital key In some implementations, the switching to the profile selected based on the third slot ID in the third digital key can include switching to the first profile in response the third slot ID matches the first slot ID.

In some implementations, the method can further comprise issuing, by the management server, the first digital key including the first slot ID and transmitting the first digital key including the first slot ID to a first user terminal and the vehicle in response to receiving first user information and a request for issuance of the first digital key, and issuing the shared key including a slot ID determined based on a result of comparing the first user information and second user information and transmitting the shared key to a terminal to be given the shared key and the vehicle in response to receiving the second user information and a request for issuance of the shared key.

In some implementations, the issuing and transmitting of the first digital key can include registering a first account based on the first user information and linking the first slot ID to the first account.

In some implementations, the issuing and transmitting of the shared key can include determining a second account based on the second user information.

According to implementations of these features, it may be possible to link a profile to multiple devices rather than just one, and, as a digital key is shared with a device, the device can be automatically registered to a vehicle, and a profile can be linked thereto accordingly.

According to implementations of these features, when a digital key is shared with a driver's second and third devices, the profiles of the devices can be automatically switched to the profile linked to the digital key only with unlocking the vehicle's doors. Here, it may be unnecessary to link the profile to each device manually on the AVN screen in the vehicle.

In addition, when a digital key is shared with the second and third phones of a user's acquaintance (e.g., the user's wife) after the digital key has been shared with his/her first phone, the digital key can be automatically linked to the acquaintance's profile with unlocking the vehicle's doors.

BRIEF DESCRIPTION OF THE DRAWINGS

FIG. 4 is a diagram illustrating an example of the digital keys managed by the management server.

DETAILED DESCRIPTION

A unit, a control unit, a control device, or a controller is only a term widely used to name devices for controlling a certain function, and do not mean a generic function unit. For example, devices with these names may include a communication device that communicates with other controllers or sensors to control a certain function, a computer-readable recording medium that stores an operating system, logic instructions, input/output information, etc., and one or more processors that perform operations of determination, calculation, making decisions, etc. required to control the function.

Meanwhile, the processor may include a semiconductor integrated circuit and/or electronic devices that carry out operations of at least one of comparison, determination, calculation, and making decisions to perform a programmed function. For example, the processor may be any one or a combination of a computer, a microprocessor, a CPU, an ASIC, and an electronic circuit such as circuitry and logic circuits.

Examples of a computer-readable recording medium (or simply called a memory) may include all types of storage devices for storing data that can be read by a computer system. For example, they may include at least one of a memory such as a flash memory, a hard disk, a micro memory, and a card memory, e.g., a secure digital card (SD card) or an eXtream digital card (XD card), and a memory such as a random access memory (RAM), a static ram (SRAM), a read-only memory (ROM), a programmable ROM (PROM), an electrically erasable PROM (EEPROM), a magnetic RAM (MRAM), a magnetic disk, and an optical disk.

Such a recording medium may be electrically connected to the processor, and the processor may load and write data from the recording medium. The recording medium and the processor may be integrated or may be physically separate.

Figure 1:
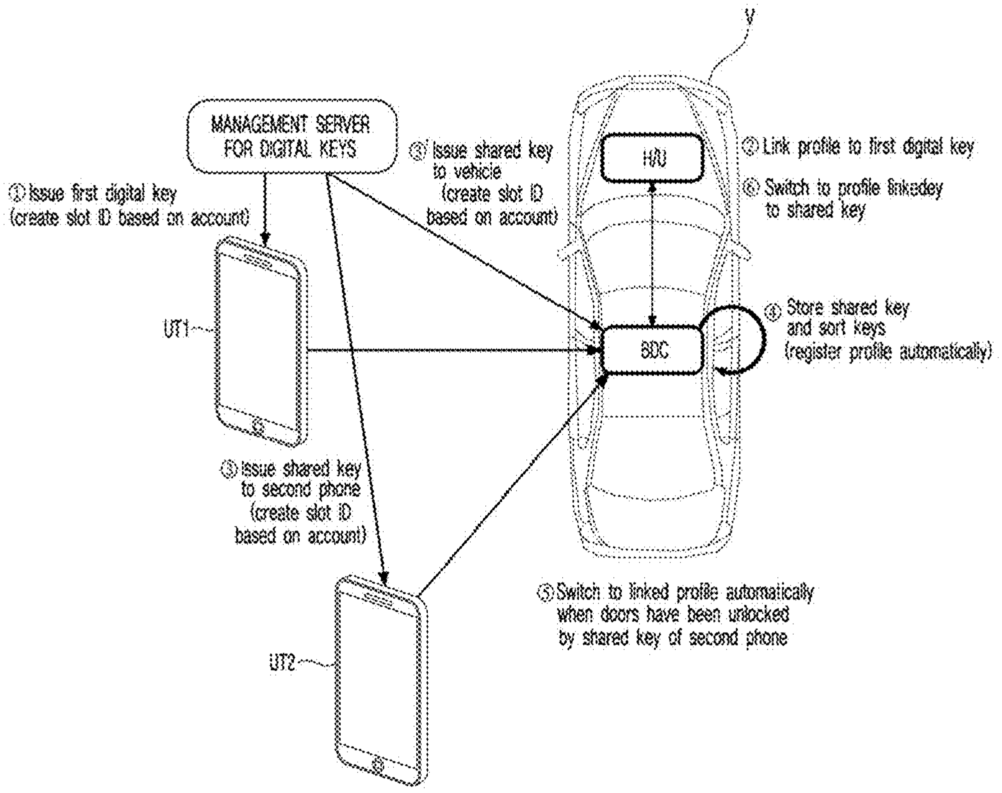
FIG. 1 is a diagram illustrating an example of interaction between a vehicle, a management server, and a user terminal.

First, FIG. 1 illustrates how a vehicle V, a management server, and a user terminal interact with one another.

The digital key management server may issue and manage digital keys.

In addition, the management server may transmit information on a user interface program (hereinafter, referred to as an "app") for using the digital key service to the vehicle V or the user terminal for which the service will provided.

It may be possible for the owner of the vehicle V to download the app by accessing the website provided by the management server and use various services related to the digital key through the app.

For example, the owner of the vehicle V may access the management server through the app on a first user terminal UT1, which can be referred to as an "owner terminal" without limiting the implementation by the name, and request the issuance of a first digital key, which can be referred to as an "owner key" without limiting the implementation by the name.

When the issuance of the first digital key is requested, first user information may be transmitted from the first user terminal UT1.

The management server may determine a corresponding account based on the first user information and issue the first digital key to which a first slot ID created in connection with the account has been assigned.

The issued first digital key may be transmitted to the first user terminal UT1 and the vehicle V by the management server.

The vehicle V may include a controller that registers and manages profiles and digital keys, and may perform the processes in FIGS. 5 and 6, which will be described below.

In some implementations, the controller may include a head unit H/U and a body domain controller BDC, which will be described below, but this implementation is not necessarily limited thereto.

The head unit H/U may provide a unified hardware interface for a related system in the vehicle V, and, for example, may include screens, buttons, and system controls for numerous integrated information and entertainment functions.

In addition, the head unit H/U can also be called an infotainment system.

The head unit H/U may be located in the center of the dashboard or the console of a vehicle, and provide an interface for information on the vehicle and entertainment media components.

For example, the information on the vehicle and the entertainment media components may include AM/FM radio, satellite radio, DVDs/CDs, USB MP3, dashcams, GPS navigation, Bluetooth, Wi-Fi, etc., and, sometimes, information on the status of the vehicle's systems.

It may be possible for users to create and register profiles through a profile-related user interface provided on the screen (e.g., AVN screen) of the head unit H/U.

The BDC may be a platform controller that performs electronic convenience functions related to the body domain area of the vehicle V.

For example, the BDC may perform functions for body control, function for entry/starting through digital keys, functions for monitoring tire pressure, functions of immobilizer, functions for authenticating digital keys, and functions for control of autonomous parking.

The first digital key transmitted from the management server may be stored and managed in the BDC.

For example, when the first user terminal UT1 in which the first digital key is stored approaches the vehicle V, the BDC may receive the first digital key in the first user terminal UT1 through short-distance communication and may perform the authentication of the first digital key by comparing it with the stored information on keys.

When the first digital key has been authenticated, the BDC may allow control related to the digital key, such as unlocking doors and starting a vehicle, to be carried out.

A profile may be linked to a digital key automatically or manually through cooperation between the BDC and the head unit H/U, which will be briefly described below.

First, it may be possible for the owner of the vehicle V to create a first profile on the screen of the head unit H/U and link the first digital key to the profile.

For the linking, the head unit H/U may request and receive information on the digital key from the BDC and output the received information on the digital key on the screen to allow a user to select it. A plurality of shared digital keys (hereinafter, referred to as "shared keys"), including the first digital key, may have been stored in the BDC.

The head unit H/U may link the first profile to the first digital key using the first slot ID in the first digital key and manage it.

When a door has been unlocked with the first digital key in the user terminal after the linking of the profile thereto is completed, the BDC may transmit the first digital key or the first slot ID included in the first digital key to the head unit H/U, and the head unit H/U may switch to the linked profile accordingly.

Meanwhile, the owner of the vehicle V may request the management server to issue a shared key to a second user terminal UT2, which can be called a "second terminal." That is, for example, the owner of the vehicle V may execute the app in the first user terminal UT1 to send a request for issuance of a shared key, including second user information of the second user terminal UT2 (e.g., the phone number or email account for the second user terminal UT2), to the management server.

In response to the request for issuance of a shared key, the management server may generate a shared key by assigning a slot ID and then transmit it to the second user terminal UT2 and the vehicle V.

The transmitted shared key may be stored in the BDC of the vehicle V and the second user terminal UT2.

When, on the second user terminal UT2, there has been a request for access to the vehicle V (e.g., unlocking the doors) using a shared key stored in the second user terminal UT2, the BDC may perform authentication of the shared key.

Here, the BDC may transmit the shared key or the slot ID to the head unit H/U, and the head unit H/U may switch the settings of the vehicle V to those for the profile linked to the slot ID.

Figure 2:
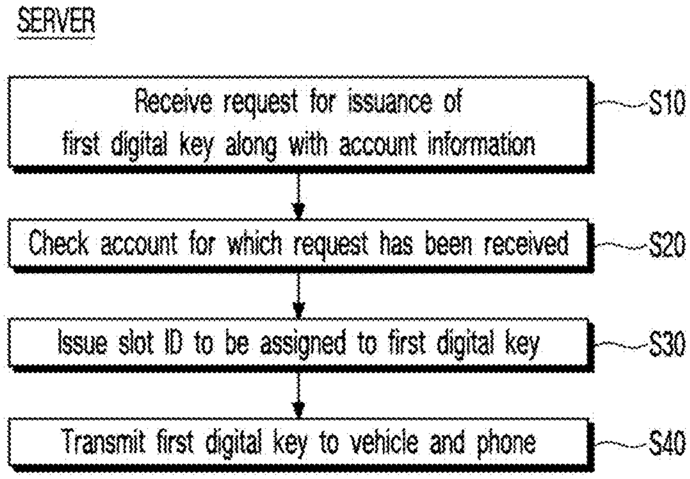
FIG. 2 is a diagram illustrating an example of a process of issuing a first digital key through the management server.

FIG. 2 shows the process of issuing the first digital key through the management server, which will be described below.

The management server may receive a request for the issuance of the first digital key at S10.

In addition, the request may include account information as the first user information.

The account information may be automatically transmitted from the first user terminal UT1 and may include the phone number or email account for the first user terminal UT1.

One user terminal may be linked to one email account, and the linked email account may be used as the account information.

The management server may determine a corresponding account (hereinafter, referred to as a "first account," which can be called an "owner account without limiting the implementation by the name) based on the account information received at S20, and may issue the first digital key to which the first slot ID has been assigned at S30.

The management server may link the first account, the first slot ID, and the first digital key to each other to store and manage them.

The first digital key that has been issued may be transmitted to and stored in the vehicle V and the first user terminal UT1 at S40.

Figure 3:
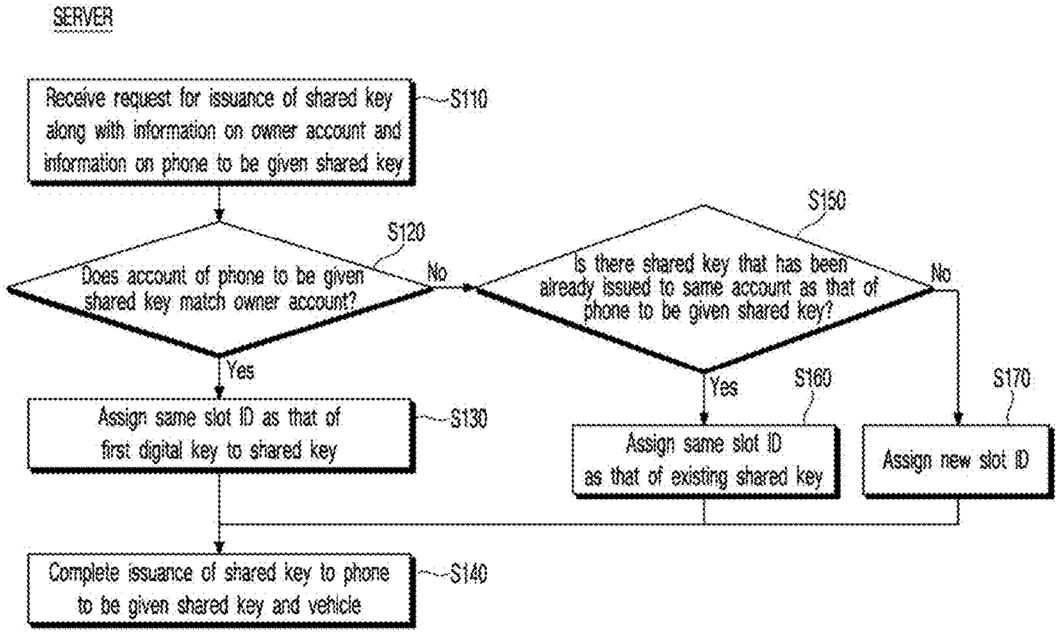
FIG. 3 is a diagram illustrating an example of a process of issuing a shared key by the management server.

FIG. 3 shows the process of issuing a shared key by the management server, which will be described below.

First, the management server may receive a request for issuance of a shared key at S110. Along with the request, the management server may receive the first account information and the second user information of the second user terminal UT2 (hereinafter, referred to as a "terminal to be given a shared key") in which the shared key is to be stored. Here, the second user information may include the account information of a terminal to be given a shared key (e.g., the phone number or email account for the terminal). Hereinafter, the account of a terminal to be given a shared key will be referred to as a second account simply to distinguish it from the first account without limiting the implementation by the expression.

A terminal to be given a shared key may be a tablet computer, a smartphone, or a smart watch (e.g., Apple Watch), as described below, but, in some implementations, a smartphone (hereinafter, referred to as a "phone to be given a shared key") serves as a terminal to be given a shared key.

Upon receiving the request, the management server may compare the account of a phone to be given a shared key, i.e., the second account, and the first account at S120.

When it is determined that the second account matches the first account at S120, a shared key to which the same first slot ID as that of the first digital key has been assigned may be generated at S130.

Then, the management server may transmit the shared key that has been generated to the phone to be given a shared key and the vehicle V at S140.

Meanwhile, when it is determined that the second account is different from the first account at S120, the management server may determine whether there is another shared key that has been already issued to an account matching the second account at S150.

When it is determined at S150 that there is a shared key that has been already issued to an account matching the second account, the management server may generate a shared key with the same slot ID as that of the shared key that has been issued at S160. In addition, when it is not determined that there is a shared key issued to an account matching the second account, the management server may generate a shared key with a new slot ID at S170.

The shared key generated at S160 or S170 may be transmitted to and stored in the vehicle V and the phone to be given a shared key at S140.

FIG. 4 illustrates the first digital keys and shared keys generated and managed by the management server, which will be described below.

First, in case 1, the first account, i.e., the owner account, is "aaa@naver.com," and the first digital key includes the first slot ID of "0." In addition, the key data of the first digital key includes the "owner 1st key" as information on the type of the first user terminal UT1.

As shown in FIG. 4, the management server may store and manage the first digital key, including the slot ID and the key data, in connection with the first account.

In case 2, a shared key is issued to a smart watch with the same account information of "aaa@naver.com."

In this case, since the account information of the smart watch matches the first account, the management server issues the shared key with the same slot ID, i.e., the first slot ID of "0."

Here, the information on the type of terminal in the key data of the shared key is recorded as the "owner watch key."

In case 3, since the account of a phone to be given a shared kye is "ZZZ@daum.net," different from the owner account, the slot ID of "1," different from the first slot ID, is given.

In addition, the "key of a phone to be given a shared kye" is recorded in the key data as information on the type of terminal.

In case 4, the account of another phone to be given a shared kye is "WWW@gmail.com," different form the account in case 3, "ZZZ@daum.net," as well as the owner account, so a new slot ID of "2" is given.

The "key of a phone to be given a shared kye" is also recorded in the key data in case 4 as information on the type of terminal.

In case 5, a shared key is issued to another smart watch with the account of "WWW@gmail.com," and, since a shared key has been already issued to the account, the same slot ID of "2" as that of the account is assigned.

In case 5, the "key of a watch to be given a shared key" is recorded as information on the type of terminal in the key data.

In case 6, a shared key is issued to another phone to be given a shared key with the account of "ZZZ@daum.net," and, since a shared key has been already issued to the account, the same slot ID of "1" as that of the account is assigned.

In case 7, a shared key is issued to the second phone with the first account of "aaa@naver.com," the same slot ID of "0" as that of the first account is assigned, and the "key of owner's second phone" is recorded as information on the type of terminal in the key data.

Figure 5:
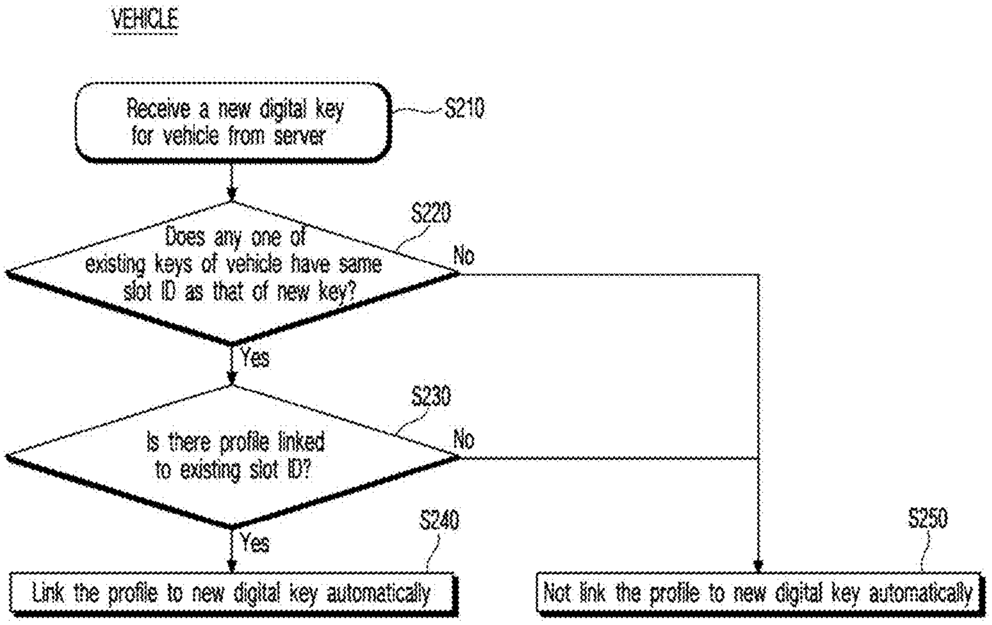
FIG. 5 is a diagram illustrating an example of a process in which a digital key is stored in a vehicle and a profile is linked thereto.
Figure 6:
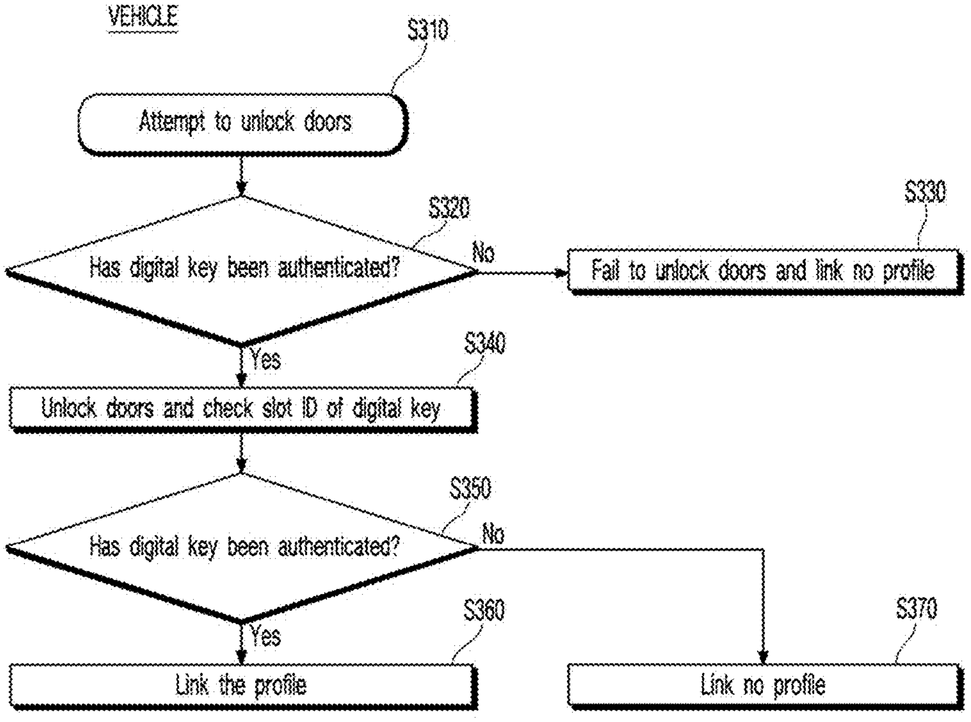
FIG. 6 is a diagram illustrating an example of a process in which a profile is linked and switching to the linked profile is done upon a request for access to the vehicle by a digital key.

FIGS. 5 and 6 show how the process proceeds in the vehicle V, which will be described in detail below.

FIG. 5 illustrates a process in which a digital key is stored in the vehicle V and a profile is linked thereto accordingly.

Referring to FIG. 5, the BDC of the vehicle V may receive a new digital key from the management server at S210. The BDC may transmit information on the received digital key or the slot ID therein to the head unit H/U.

At S220, the head unit H/U may determine whether there is a digital key with the same slot ID as that of the new digital key among the digital keys that have been already input.

When the head unit H/U determines that there is the same slot ID as that of the new digital key at S220, it may determine whether there is a profile linked to the slot ID at S230.

When the head unit H/U determines that there is a linked profile at S230, it may link the profile to the new digital key at S240.

Meanwhile, when the head unit H/U does not determine that there is the same slot ID as that of the new digital key at S220 nor that there is a linked profile at S230, it may not link a profile to the new digital key at S250.

FIG. 6 illustrates a process in which a profile is linked and the switching to the linked profile is done upon a request for access to the vehicle V by a digital key.

When it has been attempted to unlock doors with a digital key at S310, the BDC may perform authentication of the digital key at S320.

When the digital key has not been authenticated, the doors may not be unlocked at S330.

When the digital key has been authenticated, the BDC may unlock the doors and check the slot ID of the digital key at S340.

The BDC may transmit information on the digital key or the slot ID to the head unit H/U, and the head unit H/U may determine whether there is a profile linked to the slot ID at S350.

When it is determined that there is a profile linked to the slot ID at S350, the settings of the vehicle V may be switched to those of the profile at S360, and, if not, the existing profile may be maintained at S370.

Meanwhile, in some implementations, the user terminal may be a tablet computer, a smartphone, or a smart watch.

In some implementations, linking of a profile resulting from unlocking of doors has been described. However, as described above, unlocking of doors is only an example of access to a vehicle using a digital key, and this implementation is not limited to the unlocking of doors.

What is claimed is:

1. A vehicle for which a digital key service is provided through a management server that issues and manages digital keys and shared keys based on a request for issuance of the digital keys and the shared keys being transmitted through a user interface of the vehicle or a user terminal, wherein the vehicle is configured to execute instructions to perform operations comprising:

registering a first profile based on a request;

storing a first digital key including a first slot ID received from the management server;

linking the first slot ID to the first profile;

receiving, from the management server, a shared key;

selecting a profile based on a comparison between a second slot ID in the received shared key and the first slot ID, wherein:

the first digital key and shared key include terminal type information, when issuing a first digital key and a first slot ID for a first account using a first terminal, the first digital key is issued with first terminal type information, when issuing a second digital key and a second slot ID for a second account using a second terminal, the second slot ID is issued with a same slot ID as the first slot ID, and the second digital key is issued with second terminal type information, the second account being identical to the first account, and when issuing a third digital key and a third slot ID for a third account using a third terminal, the third slot ID is issued with a different slot ID from the first slot ID, and the third digital key is issued with third terminal type information included, the third account being different from the first account or the second account.

2. The vehicle of claim 1, wherein selecting a profile includes selecting the first profile for the shared key based on the second slot ID being identical to the first slot ID.

3. The vehicle of claim 2, wherein selecting a profile further includes selecting a corresponding profile for the shared key based on the second slot ID matching a slot ID linked to the corresponding profile.

4. The vehicle of claim 3, wherein the operations further comprise:

receiving a request for access by the third digital key through a user terminal;

performing an authentication by comparing the third digital key with the first digital key and the shared key; and switching a current profile of the vehicle to a profile selected based on a third slot ID included in the third digital key.

5. The vehicle of claim 4, wherein switching to the profile selected based on the third slot ID in the third digital key includes switching to the first profile based on the third slot ID being identical to the first slot ID.

6. A management server configured to issue and manage digital keys and shared keys based on a request for issuance of the digital keys and the shared keys being transmitted through a user interface of a vehicle or a user terminal, the management server being configured to execute instructions to perform operations comprising:

issuing, based on information regarding a first user and a request for issuance of a first digital key being received, the first digital key with a first slot ID to be included and transmitted to a first user terminal and the vehicle; and issuing, based on information regarding a second user and a request for issuance of a shared key being received, the shared key with a slot ID determined based on a comparison between the information regarding the first user and the information regarding the second user, to thereby transmit the shared key to a terminal, wherein:

the first digital key and shared key include terminal type information, when issuing a first digital key and a first slot ID for a first account using a first terminal, the first digital key is issued with first terminal type information, when issuing a second digital key and a second slot ID for a second account using a second terminal, the second slot ID is issued with a same slot ID as the first slot ID, and the second digital key is issued with second terminal type information, the second account being identical to the first account, and when issuing a third digital key and a third slot ID for a third account using a third terminal, the third slot ID is issued with a different slot ID from the first slot ID, and the third digital key is issued with third terminal type information included, the third account being different from the first account or the second account.

7. The management server of claim 6, wherein issuing and transmitting the first digital key includes (i) registering the first account based on the information regarding the first user and (ii) linking the first slot ID to the first account.

8. The management server of claim 7, wherein issuing and transmitting the shared key includes determining the second account based on the information regarding the second user.

9. The management server of claim 8, wherein issuing and transmitting the shared key further includes issuing the shared key with the first slot ID included based on the second account being identical to the first account.

10. The management server of claim 9, wherein issuing and transmitting the shared key further includes issuing the shared key including a slot ID other than the first slot ID based on the second account being different from the first account.

11. The management server of claim 10, wherein issuing the shared key including a slot ID other than the first slot ID includes (i) issuing the shared key with a same slot ID as a slot ID of a shared key that has been already issued based on the second account being identical to a third account of the shared key that has been already issued and (ii) issuing the shared key with a new slot ID based on the second account does being different from the third account.

12. A method of providing a digital key service through a management server configured to issue and manage digital keys and shared keys based on a request for issuance of the digital keys and the shared keys being transmitted through a user interface of a vehicle or a user terminal, the method comprising:

registering, by the vehicle, a first profile based on a request;

receiving, at the vehicle, a first digital key including a first slot ID from the management server;

linking, by the vehicle, the first slot ID to the first profile;

receiving, by the vehicle, the shared key from the management server;

selecting, by the vehicle, a profile based on a comparison between a second slot ID in the shared key and the first slot ID, wherein:

the first digital key and shared key include terminal type information, when issuing a first digital key and a first slot ID for a first account using a first terminal, the first digital key is issued with first terminal type information, when issuing a second digital key and a second slot ID for a second account using a second terminal, the second slot ID is issued with a same slot ID as the first slot ID, and the second digital key is issued with second terminal type information, the second account being identical to the first account, and when issuing a third digital key and a third slot ID for a third account using a third terminal, the third slot ID is issued with a different slot ID from the first slot ID, and the third digital key is issued with third terminal type information included, the third account being different from the first account or the second account.

13. The method of claim 12, wherein selecting a profile includes selecting the first profile for the shared key based on the second slot ID being identical to the first slot ID.

14. The method of claim 13, wherein selecting a profile further includes selecting a corresponding profile for the shared key based on the second slot ID being identical to a slot ID liked to the corresponding profile.

15. The method of claim 14, further comprising:

receiving, by the vehicle, a request for access by the third digital key through a user terminal;

performing an authentication by comparing the third digital key with the first digital key and the shared key; and switching a current profile of the vehicle to a profile selected based on a third slot ID included in the third digital key.

16. The method of claim 15, wherein switching to the profile selected based on the third slot ID in the third digital key includes switching to the first profile based on the third slot ID being identical to the first slot ID.

17. The method of claim 12, further comprising:

issuing, by the management server, the first digital key including the first slot ID; and transmitting the first digital key including the first slot ID to a first user terminal and the vehicle based on first user information and a request for issuance of the first digital key being received;

issuing the shared key including a slot ID determined based on a comparison between the first user information and second user information; and transmitting the shared key to a terminal to be given the shared key and the vehicle based on the second user information and a request for issuance of the shared key being received.

18. The method of claim 17, wherein issuing and transmitting the first digital key includes (i) registering the first account based on the first user information and (ii) linking the first slot ID to the first account.

19. The method of claim 18, wherein issuing and transmitting the shared key includes determining the second account based on the second user information.

* * * * *